Feb. 29, 1944.  R. D. EVANS  2,343,109
FABRIC
Filed March 25, 1941
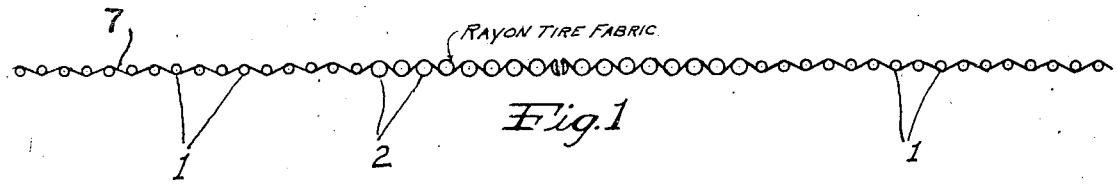
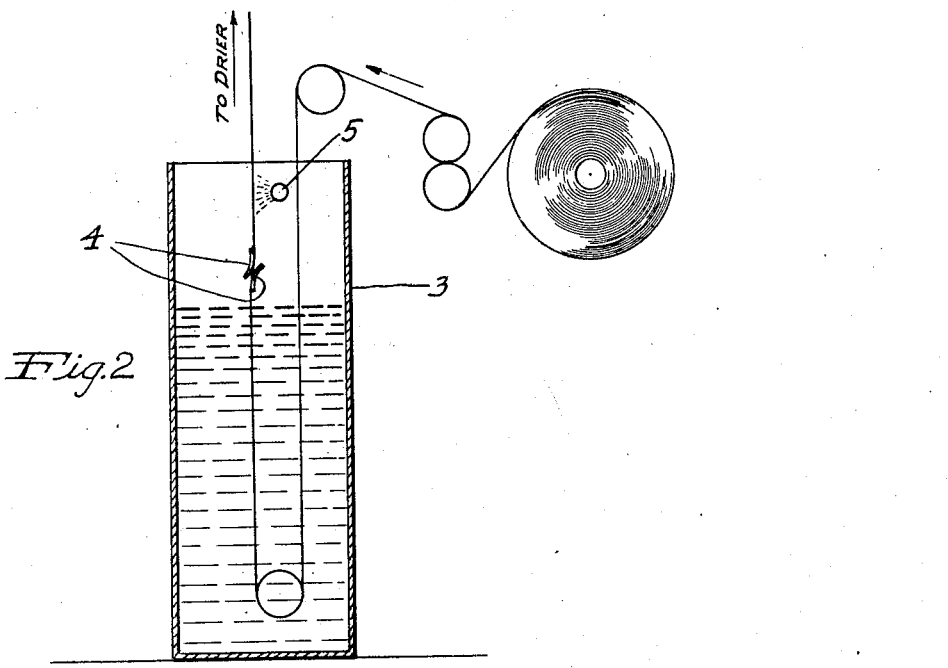
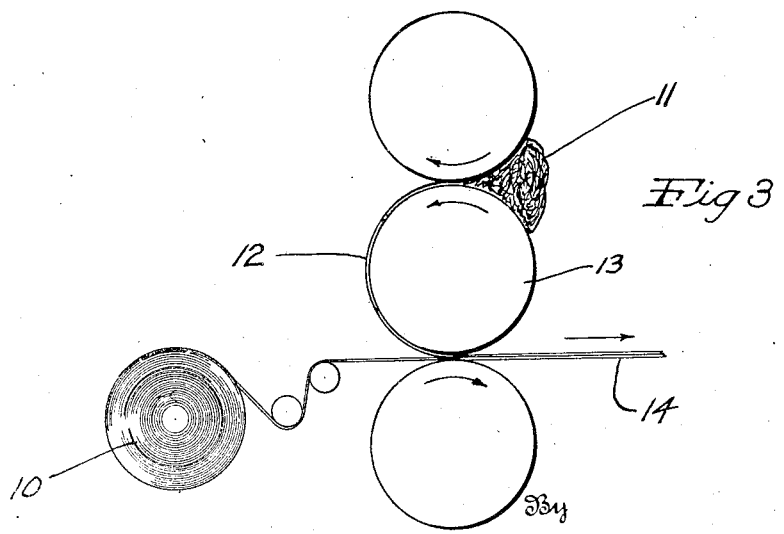
Inventor
Rhys D. Evans
By
Attorney Patented Feb. 29, 1944

2,343,109

UNITED STATES PATENT OFFICE 2,343,109

FABRIC

Rhys D. Evans, Akron, Ohio, assignor to Wingfoot Corporation, Akron, Ohio, a corporation of Delaware Application March 25, 1941, Serial No. 385,209

1 Claim. (Cl. 139—383)

This invention relates to a new tire fabric and the treatment of tire fabric. It includes the new fabric prior to treatment, the process of treatment and the product obtained by the treatment. More particularly it relates to rayon tire fabric the selvages of which are made from cord of smaller diameter than the balance of the cords in the fabric. The use of such fabric has resulted in an improved process of dipping and calendering, and the invention includes such treatment applied to the new fabric as well as the resulting treated fabric.

The advent of rayon fabric in the manufacture of pneumatic tires for passenger cars, busses, trucks, etc., has introduced several new problems into the manufacture of tires. For example, in manufacturing tires from cotton fabric no adhesive has been necessary to bind the rubber to the cotton. The rubber has been calendered directly onto the cotton, and the fuzz or "whiskers" on the cotton when embedded in the rubber coating have anchored the cotton to the rubber and prevented separation of the rubber from the fabric. As there is no fuzz on rayon fabric the rayon cannot be anchored to the rubber in this manner. It is necessary to use an adhesive for binding the rubber to the rayon.

Various different adhesives may be employed for preventing separation of the rubber of the tire from the rayon. These usually comprise a material which is soluble in water or emulsified in water. The usual method of applying the adhesive is to dip the fabric into the adhesive bath and then dry it, and then coat the fabric by passing it through a calender in which rubber is applied to the fabric.

This invention relates to such a process and the improvement lies in using a new type of fabric in such a process. The fabric is the cord type of fabric which is substantially weftless, although it comprises a pick thread to keep the cords in place. The difficulty which the invention is designed to overcome is caused by the fact that this fabric shrinks laterally during the dipping process. For example, the shrinking is ordinarily of the order of 10% of the width of the fabric. For example, the width of the fabric before dipping may be 62 inches and after dipping only about 55 inches or less. To compensate for this shrinkage it has been customary to distribute the cords of the fabric unevenly with more cords per inch towards the center of the fabric and fewer cords per inch towards the selvages, so that as the fabric shrinks and becomes narrower and the cords at the sides of the fabric are brought closer together and toward the center of the fabric the distance between all the cords of the finished fabric will be substantially uniform.

In spite of attempts of this nature to overcome the effect of shrinkage, difficulty is still experienced. The cords at the sides of the fabric are brought so close together that after the fabric is dipped in the adhesive and is passed through the usual blowing operation in which excess adhesive is blown from the fabric, the removal of the excess adhesive is impeded. Furthermore, in the calendering operation after the adhesive has dried the cords at the sides of the fabric are so close together that the rubber cannot be pressed down between them and as a result the sides of the fabric and particularly the selvages do not take up as much rubber as the center portion of the fabric, and the rubber tends to build up on the calender rolls at the selvages, and there is a tendency for the fabric to buckle or fold over.

It has been found that such difficulties are largely or entirely overcome if the selvages of the fabric are made of cord of smaller diameter than the cord used in the central portion of the tire fabric. These cords are spaced rather far apart, and the centers are preferably much farther apart than the centers of the larger cords in the central portion of the fabric. The cords at the selvages after shrinking are not so close together that they interfere with the removal of excess adhesive from the fabric by blowing. In the calender, the smaller cords permit the deposition of as much rubber on the fabric at the selvages as in the center of the fabric. Since the rubber is deposited substantially evenly throughout the width of the fabric the difficulties in calendering are largely or entirely overcome.

The invention will be described more particularly as applied to a particular tire cord 62 inches in width, although it will be understood that the invention is not limited thereto. This fabric is made up of cords which are known in the art as 275/3/3 cords. They are about 0.023 inch in diameter. The fabric averages about 28 cords to an inch as an overall average, although anticipating the shrinkage which occurs on treatment with the adhesive, the cords on the center line of the fabric are arranged somewhat closer together at the loom than those at the outside edges. The improvement in the fabric consists in making the selvages of a finer cord, such as a 275/4/2 which is about 0.022 inch in diameter. The number of cords in the selvage may vary, but in general about 16 such cords placed at each edge of the fabric will be satisfactory. When treated with the adhesive this fabric will shrink and whereas it covers a space 62 inches wide on the face of the roll over which it passes in entering the adhesive bath it will cover no more than about 55 inches on the face of the roll after dipping and shrinking.

The cords in the center of the fabric need not shift their position at all. They will remain in about the same position after dipping as before. However, it will be noted that the selvage cords must be brought toward the center line of the fabric about 3 or 3½ inches during the dipping operation due to shrinkage of the fabric. The cords intermediate between these selvage cords and the cords at the center of the fabric will be moved a proportionate amount towards the center. It is this movement of the cords from the edges of the fabric toward the center which has caused the cords to be brought too close together and to pile up at the selvages. By using cords of smaller diameter they may be brought close together without the same ill effects as noticed with larger cords, because when rubber is applied to this type of fabric on the calender there is no accumulation of rubber at the edges of the fabric. This is so, because although the same amount of rubber cannot be forced between the cords at the edges of the fabric as is forced between the cords at the center, due to the fact that the cords are closer together near the edges, the thinner cords at the edges permit the deposition of a somewhat thicker coat of rubber at the edges. The size and number of the smaller cords is adjusted so that the amount of rubber deposited on the top and bottom of the smaller cords at the edges of the fabric is approximately as much greater than the smaller amount deposited on the top and bottom of the larger cords in the middle of the fabric, as the amount deposited between the cords at the edges of the fabric where the cords have been drawn together on shrinking is smaller than the amount deposited between the cords at the center of the fabric. The consumption of rubber is thus maintained sufficiently uniform across the entire width of the calender to prevent or reduce the buckling, etc., which causes difficulties when the present treated rayon fabrics are calendered.

The width of the selvage or fabric edges, of course, may be varied. Ordinarily it will be from ½ inch to 1 inch. Furthermore the difference in size between the selvage cords and the balance of the cords may vary, although generally a difference of .001 of an inch in diameter will be sufficient to produce the improved results referred to herein. With narrow fabric no difficulty is encountered, but with fabric which is thirty-six inches wide or wider the improved construction described herein will be beneficial.

The invention will be further described in connection with the accompanying drawing in which Fig. 1 is a section through the improved, untreated rayon fabric (broken in the middle to indicate a fabric of indefinite width), Fig. 2 shows diagrammatically the apparatus used for applying the adhesive, and Fig. 3 shows the calender in a diagrammatic way.

As will be seen from Fig. 1 the improved fabric is composed of selvages made from cords of smaller diameter than the balance of the fabric. The smaller cords are indicated by the numeral 1 and the larger cords which comprise the most of the fabric are indicated by the numeral 2. The pick threads of the fabric are indicated by the numeral 7.

Although the dipping and calendering may be carried on as one continuous operation it is usual to calender at a much higher speed than can be used for dipping, and the two operations are therefore generally carried out as separate steps.

Fig. 2 shows diagrammatically the dipping tank 3 which contains adhesive. From the dipping tank the fabric goes to any suitable drier. As it leaves the tank the fabric is advantageously passed between scrapers 4 which remove a large amount of the excess of the adhesive. It is desirable to blow the fabric as it leaves the dipping tank, or as it enters the drier, or both to remove excess adhesive from between the cords of the fabric before calendering them with rubber. One blow pipe for this purpose is indicated by the numeral 5. A series of such pipes may be used to advantage. The blower 5 may be used with cold air and hot air may be used through the additional blowers. The fabric is then dried with heat. Any suitable drying means may be employed.

The fabric is shrunk by the action of the solution containing the adhesive. It shrinks 10% or more, and the cords of the fabric, particularly those at the selvages, are moved toward the center line of the fabric, as explained.

One type of adhesive which may be used comprises a mixture of an aqueous solution of a sodium caseinate and latex. Various adhesives are now in use for the treatment of rayon tire fabric. Certain adhesives may comprise more or less organic solvent, but the adhesives which cause the rayon to shrink are composed largely of water.

After leaving the drier the fabric goes through the calender. The dried fabric is usually wound on a roll 10, and the fabric is later supplied from this roll to the calender. In the calender the rubber deposit 11 is sheeted out in the sheet 12 as it passes around the center roll 13. It is then forced onto and between the cords of the fabric, and it is in this calender that in the past, difficulty has been experienced with the bunching or buckling of the cords at the side of the fabric due to the inability of the calender to incorporate as much rubber on and between the cords of the selvages as at the central portion of the fabric. It is to overcome this difficulty that the improved fabric with thin selvages is used. After leaving the calender the coated fabric 14 is taken to other equipment, such as the bias cutter, etc.

What I claim is:

Uncoated rayon tire cord pick fabric at least thirty-six inches wide, the selvages of which are composed of cords of smaller diameter than the balance of the cords of the fabric, the spaces between the smaller cords of the selvage being wider than the spaces between the larger cords in the balance of the fabric.

RHYS D. EVANS.